(12) United States Patent
Cruse et al.

(10) Patent No.: US 10,728,170 B2
(45) Date of Patent: Jul. 28, 2020

(54) DYNAMICALLY ENLARGING COUPLING FACILITY LISTS

(71) Applicant: International Business Machines Corporation, Armonk, NY (US)

(72) Inventors: Charles Cruse, Raleigh, NC (US); Christopher Meyer, Cary, NC (US); John R. Moore, Raleigh, NC (US); Joyce A. Porter, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/936,698

(22) Filed: Mar. 27, 2018

(65) Prior Publication Data

US 2019/0306079 A1   Oct. 3, 2019

(51) Int. Cl.
*H04L 12/911* (2013.01)
*H04L 29/08* (2006.01)
*G06F 16/951* (2019.01)

(52) U.S. Cl.
CPC .......... *H04L 47/783* (2013.01); *G06F 16/951* (2019.01); *H04L 67/141* (2013.01); *H04L 67/1097* (2013.01)

(58) Field of Classification Search
CPC ....... H04L 47/00–47/829; H04L 67/00–67/42; G06F 16/90–16/951
See application file for complete search history.

(56) References Cited

U.S. PATENT DOCUMENTS

| 5,410,695 A | 4/1995 | Frey et al. |
| 6,266,783 B1 | 7/2001 | Allen et al. |
| 6,584,554 B1 | 6/2003 | Dahlen et al. |
| 8,341,188 B2 | 12/2012 | Elko et al. |
| 9,253,046 B2 | 2/2016 | Elko et al. |

OTHER PUBLICATIONS

IBM et al., "Reducing the cost of data structure backing store growth in Java", An IP.com Prior Art Database Technical Disclosure, IP.com No. IPCOM000191571D, Electronic Publication Date: Jan. 7, 2010, 5 pages.

"A Method and System for Providing a Dynamic Coupling Facility Resource Management", An IP.com Prior Art Database Technical Disclosure, Disclosed Anonymously, IP.com No. IPCOM000233570D, Electronic Publication Date: Dec. 15, 2013, 5 pages.

*Primary Examiner* — Clayton R Williams
(74) *Attorney, Agent, or Firm* — Edward J. Wixted, III

(57) ABSTRACT

Aspects of the present invention disclose a method, computer program product, and system for determining a number of allowed lists and initiating a change in a number of lists. The method includes receiving a defined list count of a plurality of lists of a coupling facility structure, monitoring list usage by the coupling facility structure, determining that additional lists are required by the coupling facility structure above the defined list count, based on the monitored list usage. The method includes, in response to determining that additional lists are required by the coupling facility structure, determining a new number of lists, where the new number of lists are based on an availability of space for the new number of lists on the coupling facility structure and the new number of lists exceeds the defined list count. The method includes rebuilding coupling facility structure based upon the determined new number of lists.

20 Claims, 3 Drawing Sheets

DYNAMICALLY ENLARGING COUPLING FACILITY LISTS

BACKGROUND

The present invention relates generally to the field of systems computing, and more particularly to data sharing.

In mainframe computers, a Coupling Facility, or CF, is a piece of computer hardware which allows multiple processors to access the same data. A Mainframe Cluster relies on one or more Coupling Facilities (CFs). A coupling facility is a mainframe processor (runs with its own logical partition (LPAR), with dedicated physical CP, defined thru a hardware management console), with memory and special channels (CF Links), and a specialized operating system called Coupling Facility Control Code (CFCC). It has no Input/Output devices, other than the CF links. The information in the CF resides entirely in memory as CFCC is not a virtual memory operating system. A CF typically has a large memory on the order of several gigabytes. In principle, any mainframe can serve as a coupling facility. The CF runs no application software.

The CFCC uses an Internal Coupling Facility where the CFCC runs in a logical partition (LPAR) defined in standard processor complex and communicates over internal links within that processor complex hardware. Links to another processor unit are over networking cables. More than one CF is typically configured in a cluster for reliability and availability. Recovery support in the operating system allows structures to be rebuilt in the alternate CF in the event of a failure.

SUMMARY

According to one embodiment of the present invention, a method for determining a number of allowed lists and initiating a change in a number of lists is provided. The method includes receiving a defined list count of a plurality of lists of a coupling facility structure. The method further includes monitoring list usage by the coupling facility structure. The method further includes determining that additional lists are required by the coupling facility structure above the defined list count, based on the monitored list usage The method further includes, in response to determining that additional lists are required by the coupling facility structure, determining a new number of lists, where the new number of lists are based on an availability of space for the new number of lists on the coupling facility structure and the new number of lists exceeds the defined list count. The method further includes rebuilding the coupling facility structure based upon the determined new number of lists.

DETAILED DESCRIPTION

Figure 1:
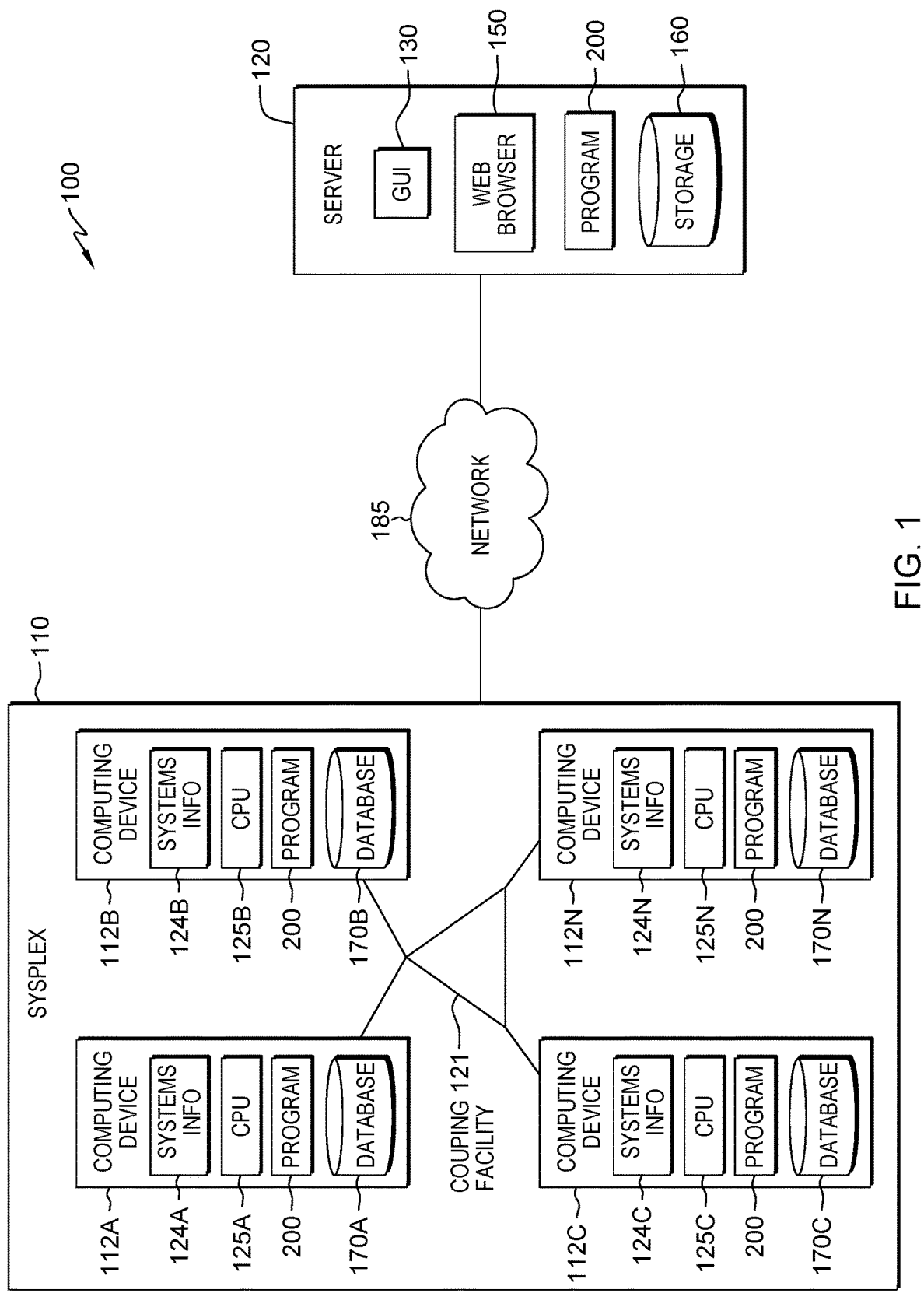
FIG. 1 is a functional block diagram illustrating a distributed data processing environment, in accordance with an embodiment of the present invention.

Embodiments of the present invention recognize that the capacity of a coupling facility structure is potentially limited by the number of allowed lists in that structure. The number of allowed lists in a structure is set at the point in time when the first system in the sysplex connects to that structure. A Sysplex is composed of independent computing devices, connected through a coupling facility that use resources made up of logical divisions of physical resources such as computing devices. The amount of information the initial connector has in order to make the proper decision about the number of needed lists at connection time is likely insufficient to make a suitable choice for the structure. Often times this value is just a constant that was settled on some years ago when the growth of the relevant function was limited by other factors. As the other limiting factors have been removed the number of allowed lists is becoming the new limiting factor.

Embodiments of the present invention recognize that current approaches to determine and change the number of allowed lists for a structure as it approaches the currently defined limit have a manual, configurable option to grow the number of allowed lists in the structure when the operator detects the need to grow the lists. The current approaches involve calculating the need for the structure size and the number of lists needed in the structure, changing the policy if necessary, specifying or modifying the number of allowed lists via a new parameter and then manually issuing a rebuild to implement the changes in the coupling facility structure. This manual process depends upon the operator acting in a timely manner.

The first connector to the rebuilt structure is the connector that sets the value of the number of allowed lists and it is unpredictable which system will be the first to connect with the new structure. With the current method, it is necessary to ensure that the configured value is set to the desired value on all the systems within a very short time window. With this manual process, the new parameter is applied to all the structures of that type and does not take into account the possibility of the system connecting to multiple structures of that same type in an environment exploiting subplexing. Generally, a subplexing environment is an environment in which cross domain resources in a sysplex system are organized into subsets. For example, the Transmission Control Protocol/Internet Protocol (TCP/IP) stacks are partitioned into subsets that are called subplexes. In this process, it may be that only one structure needs to grow the number of allowed lists to increase its capacity, but in changing the one parameter, all the structures of the same type are affected. This causes the operator to need to calculate the storage needs for all of the different structures at the new list size. This is an error prone process and is wasteful of storage for the structures that do not need the extra lists.

Embodiments of the present invention provide a method that dynamically determines the need to grow the number of allowed lists for a structure as it approaches the currently defined allowed limit and the invention effects the required change. The current method removes the possibility of a failure in a function because the human operator did not recognize the need to grow the number of allowed lists in the structure or because the operator miscalculated the requirements.

Embodiments of the present invention provide a method that will reduce the manual steps required once the recognition of the need occurs. The current method is targeted and only affects the precise structures that require expanding without impacting other structures of the same type in a subplexing environment.

Example embodiments in accordance with the present invention will now be described in detail with reference to the Figures. FIG. 1 is a functional block diagram, illustrating distributed data processing environment 100. Distributed data processing environment 100 includes sysplex 110, server computer 120, interconnected over network 185.

In one embodiment, sysplex 110 may be comprised of physical and virtualized systems. Physical systems can be a stand-alone computer, or alternatively, a computing system utilizing clustered computers and components. The computing environment may include: a computing system that includes a plurality of interconnected physical resources (e.g., microprocessors, memory, storage devices, communication devices, etc.); a local group/cluster of computing systems, such as racks of blade servers, network-attached storage systems, and storage area networks SAN); distributed computing environments, such as a cloud infrastructure; or any combination thereof.

Sysplex clusters are supported by coupling facilities; a Sysplex cluster scales very well up to several hundreds of computing devices running transaction and data base applications. Using the coupling facility links, data can be directly exchanged between the coupling facility memory and the memory of the attached systems, using a direct memory access like mechanism, without interrupting a running program. Systems in a Sysplex cluster store coupling facility information in local memory in an area called a bit vector. This enables them to locally query critical state information of other systems in the Sysplex without the need for issuing requests to the CF.

Sysplex 110 is composed of independent computing devices, connected through coupling facility 121, that use resources made up of logical divisions of physical resources, such as computing device 112A thru computing device 112N.

Coupling facility 121 provides locking, caching, and list services between coupling-capable processors. Coupling facility 121 contains data as entries which are organized into groups known as lists. Coupling facility 121 provides links to the coupling-capable processors such as computing devices 112A-112N. The coupling-facility control code (CFCC) provides the coupling-facility functions. The CFCC can run in a logical partition on computing devices 112A-112N. Coupling facility 121 enables software on different systems in sysplex 110 to share data with the assurance that the data will not be corrupted and will be consistent among all sharing users. To share data, systems must have connectivity to the coupling facility through coupling-facility links.

In one embodiment sysplex 110 is divided into multiple computing devices that include computing device 112A thru 112N. In an illustrated example, computing device 112A runs an independent operating physical environment, such as an operating system (OS). Computing device 112A includes: system information 124A, central processing unit 125A, and, database 170A. Computing device 112B includes: system information 124B, central processing unit 125B, and, database 170B. Computing device 112C includes: system information 124C, central processing unit 125C, and, database 170C. Computing device 112N includes: system information 124N, central processing unit 125N, and, database 170N. Computing device 112N and the components of computing device 112N represent that sysplex 110 is capable of being composed of multiple instances of computing devices beyond what is depicted in FIG. 1.

System info 124A and database 170A include information associated with application characteristics of respective individual computing devices. Database 170A contains and updates a profile of information of computing device 112A of sysplex 110 and the individual sub-components within computing device 112A. In an example, database 170A sends and receives information from coupling facility 121. System info 124A monitors and compiles the totality information from the various programs on computing device 112A. In an example, system info 124A utilizes one or more networking utilities to determine information associated with computing device 112A. Information monitored and compiled by system info 124A may include: a status, a retry rate, a packet loss rate, a queuing delay, a propagation delay, an error rate, a fault, and a handshaking error.

Central Processing Unit 125, (CPU) receives data input, executes instructions, and processes information. CPU 125 communicates with Input/Output (I/O) devices, which send and receive data to and from the CPU. Additionally, CPU 125 has an internal bus for communication with the internal cache memory, called the backside bus. The main bus for data transfer to and from the CPU, memory, chipset, and Accelerated Graphics Port (AGP) socket, provides a direct line of communication to the CPU and RAM which allows for a quick rendering of graphics. CPU 125 contains internal memory units, which are called registers. These registers contain data, instructions, counters, and addresses used in the Arithmetic Logic Unit (ALU) information processing.

In general, network 185 can be any combination of connections and protocols that will support communications among computing devices 112A-112N in so far as network 185 connects sysplex 110 to server 120. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes graphic user interface 130, web browser 150, storage 160, and program 200.

In an embodiment, server 120 is capable of initiating a handshake process between server 120 and sysplex 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a message to sysplex 110 indicating that server 120 wants to establish a communication channel in order to gain access to programs on sysplex 110.

In one embodiment, graphical user interface 130 operates on server 120. In another embodiment, graphical user interface 130 operates on another computer in a server based setting, for example on a server computer not pictured. In yet another embodiment, graphical user interface 130 operates on server 120 simultaneously with another server computer interconnected through network 185. Graphical user interface 130 may be any user interface used to access information from server 120. Additionally, graphical user interface 130 may be any user interface used to supply information to server 120. In some embodiments, graphical user interface 130 may present a generic web browser used to retrieve, present, and negotiate resources from the Internet. In other embodiments, graphical user interface 130 may be software or an application that enables server 120 access to network 185.

In yet another embodiment, server 120 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of server 120. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to server 120, which may operate utilizing wired (e.g., USB port) or wireless network communications (e.g., infrared, NFC, etc.). Server 120 may include components, as depicted and described in further detail with respect to FIG. 3, in accordance with embodiments of the present invention.

Storage 160 (e.g., a database) located on server 120, represents any type of storage device capable of storing data that is accessed and utilized by server 120. In other embodiments, storage 160 represents multiple storage devices within server 120. Storage 160 stores information such as, but not limited to, account information, credentials for authentication, user preferences, entry to element ratio used by coupling facility 121, and a history of coupling facility resource management (CFRM) policy. A CFRM provides the services to manage coupling facility resources in a sysplex. The management includes the enforcement of CFRM policies to ensure that the coupling facility and structure requirements as defined in each policy are satisfied.

In one embodiment, program 200 operates on multiple computing devices 112A-112N in sysplex 110. In yet another embodiment, program 200 operates on server 120. In another embodiment, program 200 operates on another computer in a server-based setting, for example on a server computer not shown. In yet another embodiment, program 200 operates on sysplex 110 simultaneously with server 120 interconnected through network 185. Program 200 provides the capability to analyze coupling facility 121 individually, or in combination with analyzing sysplex 110 in sysplex 110's totality, to dynamically determine the need to grow the number of allowed lists for a structure as the structure approaches the currently defined allowed limit for the number of allowed lists. Program 200 utilizes the information that program 200 retrieves from coupling facility 121 individually, or in combination with analyzing sysplex 110 in sysplex 110's totality, to rebuild the determined number of lists. Program 200 precisely determines the need for new lists specific for an individual computing device within sysplex 110 without impacting the other computing devices that occur in sysplex 110. In another embodiment, program 200 determines that an individual computing device within sysplex 110 needs to grow the number of lists in the coupling facility structure within sysplex 110 but that the CFRM policy and the current limit on the number of lists as defined by the user is a limiting factor. Program 200 is capable of overriding the CFRM policy and current limit on the number of lists as defined by the user and rebuilding the lists. Program 200 is capable of utilizing any suitable form of communication with the sysplex 110 (for example, Wi-Fi technology, Bluetooth, Near Field Communication tags (NFC), and Global System for Mobile Communications (GSM)).

In an example embodiment, program 200 operates as a code snippet within one or more applications on sysplex 110. Code snippets define the scope of interactivity between the snippets and the application, (e.g., program 200 hosted by a web browser application on server 120). For example, program 200 is a function within web browser 150, and the processes of program 200 occur automatically (i.e., without user intervention) during operation of web browser 150 as initiated by program 200. The dynamic code snippet elements provide scripting support. The variables enable dialog between program 200, through server 120, graphical user interface 130, and web browser 150.

Figure 2:
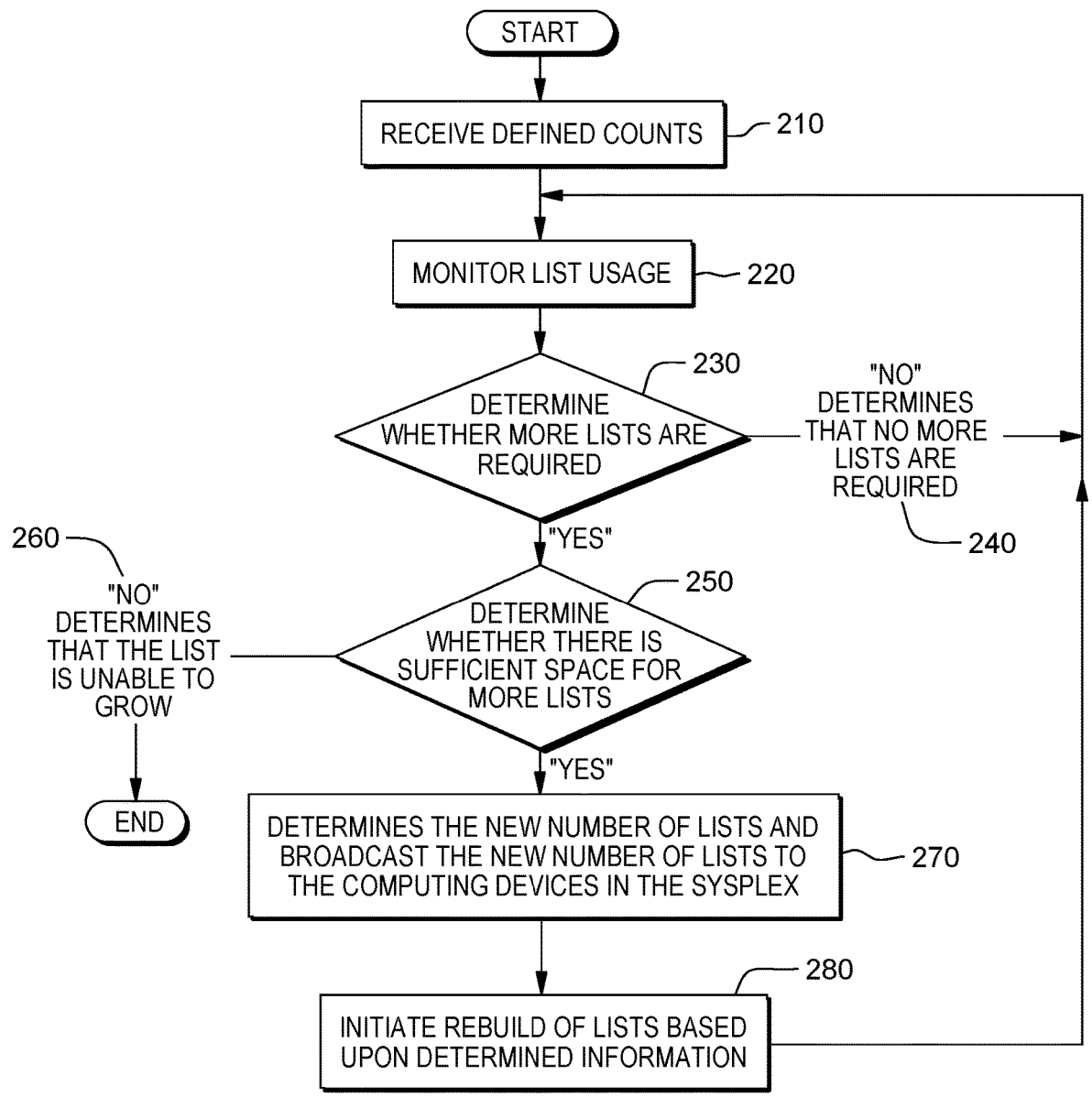
FIG. 2 is a flowchart depicting operational steps of program 200, a program that dynamically determines the need to grow the number of allowed lists for a structure as it approaches the currently defined limit and initiates the required change, in accordance with an embodiment of the present invention.

FIG. 2 is a flowchart depicting operational steps of program 200, a program for dynamically determining the need to grow the number of allowed lists for a structure as it approaches the currently defined limit and initiates the required change, in accordance with an embodiment of the present invention.

In step 210, program 200 receives defined counts. In one embodiment, program 200 receives a defined initial and maximum list count as entered by a user. In an example, program 200 receives the maximum number of lists defined by the user as the user preference and CFRM policy. In another embodiment, program 200 identifies a user selection of 'automatic' for the maximum list count for the defined number of lists in addition to the user defining the initial list count and the maximum list count for the defined number of lists. In this example, program 200 is capable of overriding the CFRM policy and the maximum number of lists defined by user policy in the event that a user did not properly set the number of initial and maximum list counts in a structure. In this example, a user miscalculated the requirements for the initial and maximum lists counts and program 200, in the 'automatic' setting, is capable of determining and changing the initial list settings.

In another embodiment, program 200 identifies a user selection of 'automatic' for the initial and maximum list counts. In this example, program 200 utilizes a CF sizing utility, not shown, to determine the initial requirements for the coupling facility structure based on a history of list changes as retrieved from databases 170A-170N on sysplex 110. Program 200 utilizes the CF sizing utility and the history of list changes to determine the maximum requirements and program 200 projects the largest that program 200 would like the system to grow. Program 200 utilizes the CF sizing utility in a first operation to set the initial value for the number of lists and program 200 utilizes the output from a second operation of the CF sizing utility to automatically configure the coupling facility policy, without user input, and to set an initial maximum value, subject to change based upon program 200's future determinations, to which the lists will be able to grow. A CF sizing utility is capable of returning the required structure size based on the number of lists used by coupling facility 121. In this example, program 200 determines the guidelines for coupling facility 121 of how much the number of lists are to grow when program 200 has determined that growth must occur. Program 200 initializes the growth based upon the number of lists, or the percentage that the lists are to increase. Program 200 sets up all the systems in sysplex 110 with these same parameters as determined by the user policy, and/or the defined counts received by a user.

In step 220, program 200 monitors list usage. In an embodiment, program 200 queries coupling facility 121 at time intervals according to user preference. In an example, program 200 monitors the number of lists in the coupling facility structure in four hour intervals to determine if the percentage increase of one or more lists has reached a threshold as set in step 210. In another embodiment, program 200 monitors list usage each time an external event causes coupling facility 121 to start using an additional list within sysplex 110. In an example, program 200 monitors coupling facility 121's list usage through operating in a sentry mode. In this example, program 200 is capable of monitoring and analyzing one or more lists after determining that an individual computing device on sysplex 110 has failed, or that an additional computing device has been added to sysplex 110 which require a reallocation of the lists.

In decision step 230, program 200 determines whether more lists are required. In an embodiment, program 200 determines whether more lists are required based upon a user preference as defined in the policy from step 210. In an example, program 200 monitors the lists on coupling facility 121, as discussed in step 220, and determines whether the percentage of lists in use have reached a threshold. In this example, program 200 determines whether the list usage is at 90% of the current limit as defined in step 210.

In another embodiment, program 200, as defined in step 210 automatically determines whether more lists are required based upon the 'automatic' setting that enables program 200 to determine the maximum list count threshold. In this example, program 200 determines whether more lists are required based upon program 200 analyzing how quickly the number of lists currently in use by sysplex 110 has grown over an interval of time as monitored in step 220.

In another embodiment, program 200 determines whether more lists are required based upon an analysis of a history of list changes in one or more databases. In this example, program 200 determines an average list usage for a coupling facility structure and an average rate of list usage growth for the structure, based upon an analysis of a history of list usage. At the latest time interval, the number of lists in use for the structure exceeds the average list usage. Analysis of the average rate of list usage growth indicates that the structure is approaching its current maximum size. Based upon this analysis at the time interval, program 200 determines whether more lists are required.

In step 240, program 200 determines that more lists are not required. More specifically in response to determining that no more lists are required (decision step 230, "no" branch) program 200 reverts back to monitoring list usage (step 220). In this example, program 200 determines that the number of lists in use have not reached a threshold of 90% in use as defined by policy in step 210. Program 200 determines that more lists are not required as a result of the number of lists not reaching the defined threshold.

In another embodiment, program 200 determines, based upon program 200 monitoring the list usage in step 220, that the number of lists have not grown rapidly. In an example, program 200 determines that the lists have not grown so rapidly as to suggest an anomaly that requires intervention by program 200. In this example, program 200 determines that the number of lists have grown incrementally within a two day time period. In this example, the incremental growth within a two day time period is consistent with a history of list growth on one or more databases. Program 200 determines that based upon the consistency of list growth with a history of list growth in one or more databases, that more lists are not required.

In decision step 250, program 200 determines whether there is sufficient space for more lists (decision step 230, "yes" branch). In an embodiment, in response to determining that more lists are required, program 200 determines whether more lists are able to be added based upon the entry to element ratio as defined, at least in part, in step 210 policy determinations. In an example, CFRM policy specifies the amount of storage a particular list structure will occupy. The list structure storage is subdivided to reserve space for list structure components such as data elements and list entry controls. Program 200 determines if there is space for additional lists based upon the value specified by a user and/or CFRM policy.

In step 260, determines that the list is unable to grow (decision step 250, "no" branch). In an example embodiment, program 200 determines that growth is unable to occur because a maximum storage value was specified by a user in step 210 and the amount of storage in use for the coupling facility structure is at that maximum. Program 200 becomes idle. In an example, program 200 determines that growth of the list is unable to occur and program 200 issues a message to a user that the entry to element ratio value as initially defined by the user is incorrect for the amount of space required for additional lists and that the list structure is in a full condition.

In step 270, program 200 determines the new number of lists and broadcasts the new number of lists to the computing devices in sysplex 110 (decision step 250, "yes" branch). In an example embodiment, program 200 automatically determines the new value for the lists, on coupling facility 121, and communicates the newly determined value through a signal/reply system where program 200 indicates via a broadcast signal in sysplex 110, that a list growth is set to occur. Program 200 applies the value for the new number of lists as determined by program 200. Program 200 communicates a larger value to the other computing devices in sysplex 110 when it has more recent list information.

In another embodiment, program 200 calculates the new number of lists by retrieving information about each recent log stream mapped to coupling facility 121 through a history of information on one or more databases, calculating the coupling facility structure list entries required per log stream, and based upon the totality of this information, calculating the total coupling facility structure size. Program 200 calculates the space needed for coupling facility 121 to contain all of the new log data for the new log streams that are mapped to coupling facility 121. In this example, program 200 utilizes the entries value for the largest log stream mapped to coupling facility 121 to calculate the size and initsize (?) parameter values for the structure definition in the CFRM policy.

In step 280, program 200 rebuilds of coupling facility structure based upon determined information. In an embodiment, program 200 utilizes the value calculated in step 270 (decision step 250 "yes" branch), agrees on the new list count and communicates the newly determined value to all computing devices (systems) in sysplex 110. Program 200 localizes the rebuild to the single structure, in this example sysplex 110, and does not impact similar structures in a different sysplex system that may be connected to sysplex 121. Program 200 issues the CF structure rebuild function to one of more individual computing devices on sysplex 110 in order to initiate rebuild process. The CF structure rebuild function controls the rebuild process for a coupling facility structure. There are two types of rebuild processing, rebuild and duplexing rebuild. Program 200 controls the rebuild structure. In an example, program 200 quiesces the old list structure, connects to the new list structure, and initiates the repopulation of all users, and computing devices, of the affected list structure. Program 200 commences a rebuild during which, it is random as to which computing device (system) will be the first connector to rebuild the structure. In this example, program 200 alerts, and displays to a user, via GUI 130, that a rebuild has occurred and provides the user with a reason for the rebuild. For example, program 200 displays the message to a user that "growth of the number of lists was determined to be required." Program 200 resumes monitoring list usage (step 220) upon completion of the rebuild process.

Figure 3:
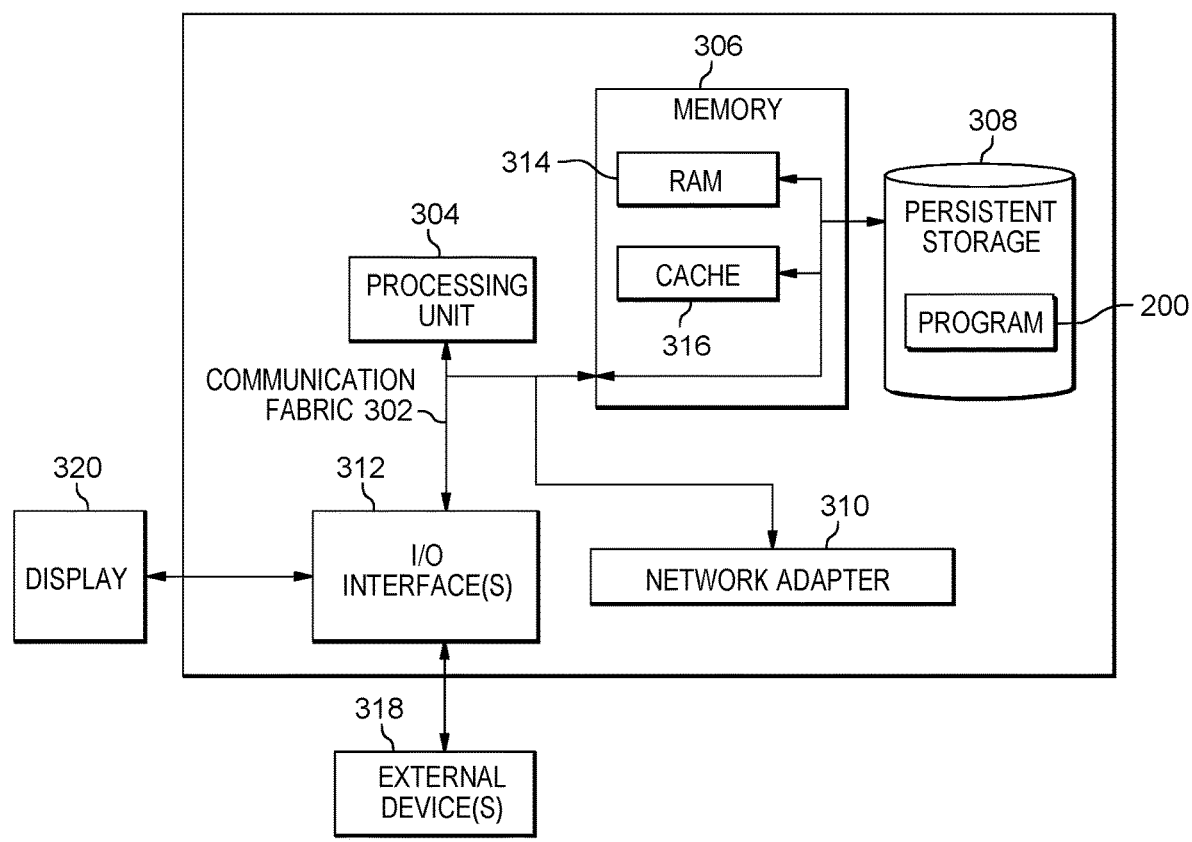
FIG. 3 is a block diagram of components of a computer system, such as the server computer of FIG. 1, in an embodiment in accordance with the present invention.

FIG. 3 depicts a block diagram of components of server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 120 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program 200 may be stored in persistent storage 308 and in memory 306 for execution by one or more of the respective computer processors 304 via cache 306. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program 200 may be downloaded to persistent storage 308 through communications unit 310.

I/O interface(s) 312 allows for input and output of data with other devices that may be connected to server 120. For example, I/O interface 312 may provide a connection to external devices 318, such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 308 via I/O interface(s) 312. I/O interface(s) 312 also connect to a display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a number of allowed lists and initiating a change in a number of lists, the method comprising:

receiving, by one or more processors, a defined list count of a plurality of lists of a coupling facility structure;

monitoring, by one or more processors, list usage by the coupling facility structure;

determining, by one or more processors, that additional lists are required by the coupling facility structure above the defined list count, based on the monitored list usage;

in response to determining that additional lists are required by the coupling facility structure, determining, by one or more processors, a new number of lists, wherein:

the new number of lists is based on an availability of space for the new number of lists on the coupling facility structure; and the new number of lists exceeds the defined list count; and rebuilding, by one or more processors, the coupling facility structure based upon the determined new number of lists.

2. The method of claim 1, wherein monitoring the list usage by a coupling facility structure further comprises:

querying, by one or more processors, the coupling facility structure at defined time intervals;

analyzing, by one or more processors, the plurality of lists whenever the coupling facility structure is accessed; and determining, by one or more processors, whether the list usage has reached a threshold setting for list usage.

3. The method of claim 1, further comprising:
displaying, by one or more processors, a message to a user that a new list count was generated.

4. The method of claim 1, wherein rebuilding the plurality of lists further comprises:
generating, by one or more processors, a new list count based upon on the determined new number of lists; and
sending, by one of more processors, the new list count to one or more computing devices operatively connected to the coupling facility structure.

5. The method of claim 1, further comprising:
subsequent to rebuilding the coupling facility structure, further monitoring, by one or more processors, the list usage by the coupling facility structure;
determining, by one or more processors, that additional lists are not required; and
responsive to determining that additional lists are not required, resuming, by one or more processors, the further monitoring.

6. The method of claim 1, further comprising:
subsequent to rebuilding the plurality of lists, further monitoring, by one or more processors, the list usage by the coupling facility structure;
determining, by one or more processors, that additional lists are required by the coupling facility structure above the new number of lists, based on the further monitoring;
determining, by one or more processors, that there is insufficient space on the coupling facility for the additional lists required by the coupling facility structure above the new number of lists; and
terminating, by one or more processors, the further monitoring.

7. The method of claim 4, wherein rebuilding the plurality of lists further comprises:
quiescing, by one or more processors, a first coupling facility list structure;
connecting, by one or more processors, to a second coupling facility list structure; and
initiating, by one or more processors, a repopulation of one or more users of the first coupling facility list structure to the second coupling facility list structure.

8. A computer program product for determining a number of allowed lists and initiating a change in a number of lists, the computer program product comprising:
one or more computer readable tangible storage media and program instructions stored on at least one of the one or more computer readable storage media, the program instructions readable/executable by one or more computer processors and further comprising:
program instructions to receive a defined list count of a plurality of lists of a coupling facility structure;
program instructions to monitor list usage by the coupling facility structure;
program instructions to determine that additional lists are required by the coupling facility structure above the defined list count, based on the monitored list usage;
program instructions to, in response to determining that additional lists are required by the coupling facility structure, determine a new number of lists, wherein:
the new number of lists is based on an availability of space for the new number of lists on the coupling facility structure; and
the new number of lists exceeds the defined list count; and
program instructions to rebuild the coupling facility structure based upon the determined new number of lists.

9. The computer program product of claim 8, wherein monitoring the list usage by a coupling facility structure further comprises program instructions to:
query the coupling facility structure at defined time intervals;
analyze the plurality of lists whenever the coupling facility structure is accessed; and
determine whether the list usage has reached a threshold setting for list usage.

10. The computer program product of claim 8, further comprising program instructions, stored on the one or more computer readable storage media, which when executed by a processor, cause the processor to:
display a message to a user that a new list count was generated.

11. The computer program product of claim 8, wherein rebuilding the plurality of lists further comprises program instructions to:
generate a new list count based upon on the determined new number of lists; and
send the new list count to one or more computing devices operatively connected to the coupling facility structure.

12. The computer program product of claim 8, further comprising program instructions, stored on the one or more computer readable storage media, which when executed by a processor, cause the processor to:
subsequent to rebuilding the coupling facility structure, further monitor the list usage by the coupling facility structure;
determine that additional lists are not required; and
responsive to determining that additional lists are not required, resume the further monitoring.

13. The computer program product of claim 8, further comprising program instructions, stored on the one or more computer readable storage media, which when executed by a processor, cause the processor to:
subsequent to rebuilding the plurality of lists, further monitor the list usage by the coupling facility structure;
determine that additional lists are required by the coupling facility structure above the new number of lists, based on the further monitoring;
determine that there is insufficient space on the coupling facility for the additional lists required by the coupling facility structure above the new number of lists; and
terminate the further monitoring.

14. The computer program product of claim 11, wherein rebuilding the plurality of lists further comprises program instructions to:
quiesce a first coupling facility list structure;
connect to a second coupling facility list structure; and
initiate a repopulation of one or more users of the first coupling facility list structure to the second coupling facility list structure.

15. A computer system comprising:
one or more computer processors;
one or more computer readable storage media; and
program instructions stored on the computer readable storage media for execution by at least one of the one or more computer processors, the program instructions comprising:
program instructions to receive a defined list count of a plurality of lists of a coupling facility structure;
program instructions to monitor list usage by the coupling facility structure;
program instructions to determine that additional lists are required by the coupling facility structure above the defined list count, based on the monitored list usage;

program instructions to, in response to determining that additional lists are required by the coupling facility structure, determine a new number of lists, wherein:
the new number of lists is based on an availability of space for the new number of lists on the coupling facility structure; and
the new number of lists exceeds the defined list count; and
program instructions to rebuild the coupling facility structure based upon the determined new number of lists.

16. The computer system of claim 15, wherein monitoring the list usage by a coupling facility structure further comprises program instructions to:
query the coupling facility structure at defined time intervals;
analyze the plurality of lists whenever the coupling facility structure is accessed; and
determine whether the list usage has reached a threshold setting for list usage.

17. The computer system of claim 15, further comprising program instructions, stored on the one or more computer readable storage media, which when executed by a processor, cause the processor to:
display a message to a user that a new list count was generated.

18. The computer system of claim 15, wherein rebuilding the plurality of lists further comprises program instructions to:
generate a new list count based upon on the determined new number of lists; and
send the new list count to one or more computing devices operatively connected to the coupling facility structure.

19. The computer system of claim 15, further comprising program instructions, stored on the one or more computer readable storage media, which when executed by a processor, cause the processor to:
subsequent to rebuilding the coupling facility structure, further monitor the list usage by the coupling facility structure;
determine that additional lists are not required; and
responsive to determining that additional lists are not required, resume the further monitoring.

20. The computer system of claim 15, further comprising program instructions, stored on the one or more computer readable storage media, which when executed by a processor, cause the processor to:
subsequent to rebuilding the plurality of lists, further monitor the list usage by the coupling facility structure;
determine that additional lists are required by the coupling facility structure above the new number of lists, based on the further monitoring;
determine that there is insufficient space on the coupling facility for the additional lists required by the coupling facility structure above the new number of lists; and
terminate the further monitoring.

* * * * *